US011430058B2

(12) United States Patent
Liu et al.

(10) Patent No.: US 11,430,058 B2
(45) Date of Patent: Aug. 30, 2022

(54) CREDIT SCORING AND PRE-APPROVAL ENGINE INTEGRATION

(71) Applicant: Capital One Services, LLC, McLean, VA (US)

(72) Inventors: Mao Lin Liu, Toronto (CA); Adam Boby, Toronto (CA); Mark Yamashita, Toronto (CA)

(73) Assignee: CAPITAL ONE SERVICES, LLC, McLean, VA (US)

(*) Notice: Subject to any disclaimer, the term of this patent is extended or adjusted under 35 U.S.C. 154(b) by 35 days.

(21) Appl. No.: 16/688,380

(22) Filed: Nov. 19, 2019

(65) Prior Publication Data

US 2020/0090267 A1 Mar. 19, 2020

Related U.S. Application Data (63) Continuation of application No. 16/036,049, filed on Jul. 16, 2018, now Pat. No. 10,529,018.

(51) Int. Cl.
| | |
|---|---|
| *G06Q 40/00* | (2012.01) |
| *G06Q 40/02* | (2012.01) |
| *G06Q 30/02* | (2012.01) |
| *G06N 20/00* | (2019.01) |

(52) U.S. Cl.
CPC .......... *G06Q 40/025* (2013.01); *G06N 20/00* (2019.01); *G06Q 30/02* (2013.01)

(58) Field of Classification Search
CPC .................................................. G06Q 40/025
USPC .......................................................... 705/44
See application file for complete search history.

(56) References Cited

U.S. PATENT DOCUMENTS

| | | | |
|---|---|---|---|
| 5,611,052 A | 3/1997 | Dykstra et al. | |
| 5,870,721 A | 2/1999 | Norris | |
| 5,930,776 A | 7/1999 | Dykstra et al. | |
| 6,088,686 A * | 7/2000 | Walker | G06Q 40/025 |
| | | | 235/383 |
| 6,208,979 B1 | 3/2001 | Sinclair | |
| 6,324,524 B1 | 11/2001 | Lent et al. | |
| 6,405,181 B2 | 6/2002 | Lent et al. | |
| 7,366,694 B2 * | 4/2008 | Lazerson | G06Q 40/025 |
| | | | 705/38 |
| 7,546,266 B2 | 6/2009 | Beime et al. | |
| 7,610,229 B1 * | 10/2009 | Kornegay | G06Q 40/04 |
| | | | 705/40 |
| 7,797,230 B1 | 9/2010 | Barie et al. | |
| 7,814,005 B2 | 10/2010 | Imrey et al. | |

(Continued)

OTHER PUBLICATIONS

Handling Uncertainty in Social Lending Credit Risk Prediction with a Choquet Fuzzy Integral Model (Year: 2007).*

(Continued)

*Primary Examiner* — Bruce I Ebersman
(74) *Attorney, Agent, or Firm* — Hunton Andrews Kurth LLP (57) ABSTRACT

Embodiments of systems and methods using integrated credit scoring and pre-approval tools are described. A credit score tool may obtain a user's credit score and associated credit information for display to the user. A credit pre-approval tool may assemble credit-related information for evaluation by a predictive model to determine whether a pre-approved offer of credit should be presented to the user along with the credit score.

20 Claims, 9 Drawing Sheets

(56) References Cited

U.S. PATENT DOCUMENTS

| | | | |
|---|---|---|---|
| 8,050,997 B1* | 11/2011 | Nosek | G06Q 40/06 |
| | | | 705/37 |
| 8,150,762 B1* | 4/2012 | Reed | G06Q 40/025 |
| | | | 705/38 |
| 8,660,943 B1* | 2/2014 | Chirehdast | G06Q 40/00 |
| | | | 705/38 |
| 9,697,248 B1* | 7/2017 | Ahi | G06Q 40/025 |
| 11,080,617 B1* | 8/2021 | Bansal | G06F 11/3013 |
| 2002/0107765 A1* | 8/2002 | Walker | G06Q 40/00 |
| | | | 705/35 |
| 2003/0036995 A1 | 2/2003 | Lazerson | |
| 2003/0061158 A1 | 3/2003 | Guy et al. | |
| 2003/0061163 A1 | 3/2003 | Durfield | |
| 2004/0054619 A1* | 3/2004 | Watson | G06Q 10/10 |
| | | | 705/38 |
| 2005/0273430 A1* | 12/2005 | Pliha | G06Q 40/02 |
| | | | 705/42 |
| 2006/0005024 A1 | 1/2006 | Law | |
| 2006/0080251 A1 | 4/2006 | Fried et al. | |
| 2007/0288641 A1* | 12/2007 | Lee | G06Q 40/08 |
| | | | 709/227 |
| 2008/0015979 A1 | 1/2008 | Bentley | |
| 2008/0059269 A1* | 3/2008 | Willis | G06Q 10/06316 |
| | | | 705/7.26 |
| 2009/0125463 A1 | 5/2009 | Hido | |
| 2010/0010930 A1 | 1/2010 | Mien et al. | |
| 2010/0138316 A1* | 6/2010 | Connors | G06F 9/451 |
| | | | 715/752 |
| 2010/0306072 A1 | 12/2010 | Ford, Jr. et al. | |
| 2011/0270779 A1 | 11/2011 | Showalter | |
| 2012/0066106 A1 | 3/2012 | Papadimitriou | |
| 2012/0239444 A1* | 9/2012 | Williams | G06Q 10/067 |
| | | | 705/7.11 |
| 2012/0317008 A1* | 12/2012 | Subramanian | G06Q 30/02 |
| | | | 707/E17.084 |
| 2012/0317013 A1* | 12/2012 | Luk | G06Q 40/025 |
| | | | 705/38 |
| 2013/0272514 A1* | 10/2013 | Dragushan | H04M 7/003 |
| | | | 379/210.01 |
| 2013/0273517 A1 | 10/2013 | Lettrick | |
| 2014/0358765 A1* | 12/2014 | Agius | G06Q 40/025 |
| | | | 705/38 |
| 2016/0232546 A1 | 8/2016 | Ranft et al. | |
| 2016/0350851 A1* | 12/2016 | Ainsworth, III | G06Q 40/025 |
| 2017/0068982 A1* | 3/2017 | Vangala | G06Q 30/0224 |
| 2017/0091861 A1 | 3/2017 | Bianchi et al. | |
| 2017/0161826 A1* | 6/2017 | Packer | G06Q 40/025 |
| 2018/0018310 A1 | 1/2018 | Unsal | |
| 2018/0130128 A1 | 5/2018 | Kottmeier, Jr. et al. | |
| 2019/0378207 A1* | 12/2019 | Dibner-Dunlap | G06Q 30/02 |
| 2020/0387832 A1* | 12/2020 | Jordan | G06N 20/20 |

OTHER PUBLICATIONS

Predicting Customer Churn: Extreme Gradient Boosting with Temporal Data (Year: 2018).*

"A Kaggle Master Explains Gradient Boosting" Ben Gorman Jan. 23, 2017 (Year: 2017).

* cited by examiner

FIG. 1

Method (200)

FIG. 2

Method (300)

FIG. 3

Selection Interface 410

Application
User Interface (400)
FIG. 4A

Credit Report Interface 420

Application
User Interface (400)

FIG. 4B

Credit Report and Pre-Approval Offer Interface 430

Application User Interface (400)

FIG. 4C

Selection Interface 510

Web Browser
User Interface (500)

CREDIT SCORING AND PRE-APPROVAL ENGINE INTEGRATION

CROSS REFERENCE TO RELATED APPLICATION

The subject application is a continuation of U.S. patent application Ser. No. 16/036,049 filed Jul. 16, 2018, the contents of which is hereby incorporated by reference in its entirety.

FIELD OF THE INVENTION

This disclosure relates to integrated credit scoring and pre-approval, and more specifically, to systems and methods using integrated credit score and pre-approval tools.

BACKGROUND

Consumers frequently receive unsolicited pre-approved offers of credit. These offers may be made in a number of ways, including from various websites and through postal mail. These offers may be convenient for consumers searching for additional credit, but many consumers may find unsolicited offers of credit annoying or distracting. In addition, obtaining a new credit product, such as a new line of credit or an expansion of an existing line, may require providing an extensive amount of personal information, including name, address, social security number, telephone number, and other sensitive information that consumers may be reluctant to submit to third parties. Accordingly, consumers may be likely to view unsolicited pre-approved credit offers negatively, especially if the offers originate from third party or otherwise unfamiliar websites.

At the same time, preparing and offering a pre-approved credit product may be costly. These costs include expenses for administration and credit decision-making, the cost of obtaining and assembling credit-related information (often from third-party sources such as credit bureaus), postage and printing costs for offers made through the mail, and computer system resources for offers made online. These costs may discourage financial institutions from offering credit to consumers. This may be true even if the consumers in question would qualify for additional credit, because the financial institution may be concerned that costs and system resources may be wasted by consumers that are not interested in obtaining credit or would not be receptive to a pre-approved offer of credit.

Accordingly, there is a need to efficiently identify consumers that would be receptive to, a pre-approved offer of credit, and there is a need to improve the user experience relating to pre-approved offers of credit.

SUMMARY

Therefore, it is an object of this disclosure to describe systems and methods for integrated credit scoring and pre-approval tools. Various embodiments describe credit scoring and pre-approval tools and systems and methods integrating credit scoring and pre-approval tools, client communication devices, and servers.

Embodiments of the present disclosure provide a credit scoring and pre-approval system comprising a user interface; a credit score tool; a credit pre-approval tool; a database containing user information, prior pre-approval offer determinations made by the credit pre-approval tool, and application usage data; and a processor, wherein, upon receipt of a credit score request from a user, the processor executes the credit score tool to obtain a credit score and associated credit score information and the credit score tool displays the credit score on the user interface, wherein, upon receipt of the credit score and the associated credit information, the processor applies a predictive model to the received credit score, the associated credit score information, prior pre-approval offer determinations, and application usage data to determine whether to present a pre-approved offer of credit to the user, and wherein, upon determining to present a pre-approved offer of credit to the user, the credit pre-approval tool displays the pre-approved offer of credit on the user interface.

Embodiments of the present disclosure provide a method for credit scoring and pre-approval, comprising obtaining a credit score and associated credit score information pertaining to a user; applying a predictive model to the credit score, the associated credit score information, and to prior pre-approval offer determinations and application usage data relating to the user; determining, based on the predictive model, whether to present a pre-approved offer of credit to the user; and presenting a pre-approved offer of credit to the user by displaying the offer on a user interface.

Embodiments of the present disclosure provide a credit pre-approval device, comprising a user interface; a processor; and a database containing information relating to a user, including a credit score, associated credit score information, prior pre-approval offer determinations made by the credit pre-approval tool, and application usage data, wherein the processor applies a predictive model to the information contained in the database, and wherein, based on the predictive model, the user interface displays a pre-approved offer of credit to the user.

DETAILED DESCRIPTION OF EXAMPLE EMBODIMENTS

One aspect of the present disclosure is to provide credit score and pre-approval tools and systems and methods integrating credit score and pre-approval tools, client devices, and servers that may efficiently identify users that may be receptive to pre-approved offers of credit and that may improve the user experience with respect to pre-approved offers of credit.

Figure 1:
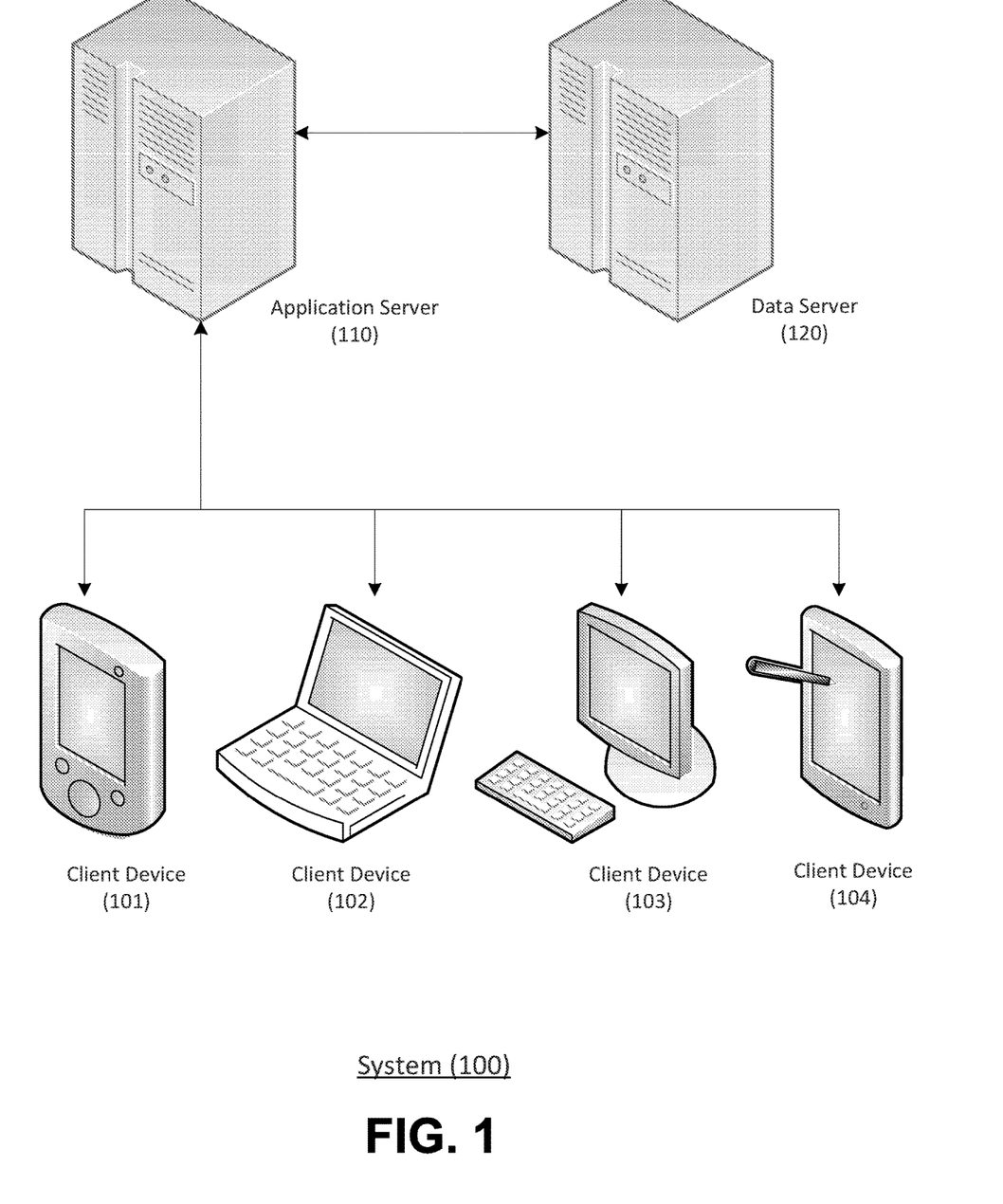
FIG. 1 illustrates an example embodiment of an integrated credit scoring and pre-approval system.

FIG. 1 illustrates an integrated credit scoring and pre-approval system 100 according to an example embodiment. In this embodiment, the system includes a plurality of client devices 101, 102, 103, 104, an application server 110, and a data server 120. As shown in FIG. 1, client device 101 may be a smartphone, client device 102 may be a laptop, client device 103 may be a desktop computer, and client device 104 may be a tablet computer. Client devices 101-104 are not limited to these examples, and may be any combination of smartphones, laptop computers, desktop computers, tablet computers, personal digital assistants, thin clients, fat clients, Internet browsers, or customized software applications. It is further understood that the client devices may be of any type of device that supports the communication and display of data and user input. While the example embodiment illustrated in FIG. 1 shows client devices 101-104, the present disclosure is not limited to a specific number of client devices, and it is understood that the system 100 may include a single client device or multiple client devices.

Client devices 101-104 may include a processor and a memory (not shown in FIG. 1). It is understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The memory may be a read-only memory, write-once read-multiple memory or read/write memory, e.g., RAM, ROM and EEPROM, and the client devices 101-104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

Client devices 101-104 may further include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The client devices 101-104 may also support a short-range wireless communication interface, such as near field communication, radio-frequency identification, and Bluetooth.

Client devices 101-104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the client devices that is available and supported by the client devices 101-104, such as a touch-screen, keyboard, mouse, cursor-control device, touch-screen, microphone, digital camera, video recorder or camcorder. These devices may be used to enter information and interact with the system 100 as described herein.

The application server 110 and data server 120 may be dedicated server computers, such as bladed servers, or may be personal computers, laptop computers, notebook computers, palm top computers, network computers, mobile devices, or any processor-controlled device capable of supporting the system 100.

The application server 110 may contain a credit score request tool, a credit pre-approval tool, and a user information database. The credit score tool and credit pre-approval tool may be software applications and may be executed by the application server 110 using one or more processors. The credit score request tool, the credit pre-approval tool, and the user information database may be stored by the application server 110 in internal or external memory, and it is understood that these tools and the user information database may also be stored on, or read from, other types of computer program products or computer-readable media, such as secondary storage devices, including hard disks, floppy disks, CD-ROM, or other forms of RAM or ROM. The computer-readable media may include instructions for controlling the system 100 and for performing a particular method, such as the methods described herein.

The data server 120 may be any server, computer, or other device that contains financial information, information relating to users of the system 100, or other information.

In an embodiment, data server 120 may contain data from one or more credit bureaus or other reporting agencies. This may include data from a consumer reporting agency (e.g., TransUnion, Equifax, Experian, and Innovis), a business reporting agency (e.g., Dun & Bradstreet, Experian Business, Equifax Commercial, Cortera, Southeastern Association of Credit Management, and PayNet), a credit rating agency (e.g., Standard & Poor's, Moody's Investors Service, and Fitch Ratings), other data collection agencies (e.g., Small Business Financial Exchange, Inc. and Payment Reporting Builds Credit, Inc.), or a combination thereof. While the foregoing list of data sources is exemplary, it is understood that the present disclosure is not limited thereto, and data server 120 may include data from one or more U.S. or foreign agencies. In an embodiment, the data server 120 may store credit score and basic associated information.

While FIG. 1 illustrates an application server 110 and a data server 120, it is understood that other embodiments may use multiple computer systems or multiple servers as necessary or desired to support the users and may also use back-up or redundant servers to prevent network downtime in the event of a failure of a particular server. It is further understood that, if all data required by the credit score tool and credit pre-approval tool is available from the application server 110 or the client devices 101-104, communication with the data server 120 may not be necessary. In such an embodiment, the system 100 may not include the data server 120.

The user information database may be a relational or non-relational database, and may be stored by application server 110. The user information database may contain financial information, information relating to users of the system 100, or other information. This data may include credit scores, basic information associated with a credit score (e.g., user identification information, open accounts, account balances, etc.), and information relating to any prior determinations to offer, or not offer, credit made to the user, including pre-approved offers of credit. The user information database may also include application usage data, such as how many times a user has requested and viewed their credit score, how the user interacts with the credit score tool and the credit pre-approval tool, and a record of the user's decisions in response to offers of credit, i.e., whether the user accepted or declined the offer. Other examples of application usage data include information identifying the device through which the user accessed the credit score tool and the credit pre-approval tool (e.g., through a smartphone, a desktop computer, or another device), how much time the user spends interacting with each tool, and other access and activity data.

The credit score tool may be in communication with the client devices 101-104, via application server 110 and the network connections described above. The credit score tool may place a user interface on the display of a client device, through which the user may request their credit score and submit identifying information (e.g., name, address, social security number) necessary to process this request. Upon receipt of the user's request and the submitted information, the credit score tool may communicate with the data server 120 in order to obtain the user's credit score and the basic credit information. The credit score tool may store this information in the user information database and the credit score tool may display this information on the user's client device. The credit score tool may provide this service at no charge to the user, or may require the payment of a fee by the user. The credit score and basic credit information obtained by the credit score tool may be provided by a third party, such as credit bureau or other reporting agency, which may charge a fee for this service.

The credit pre-approval tool may access the data stored in the user information database, including the user's credit score and basic credit information, the prior credit pre-approval determinations made for the user, and user's application usage data. In an embodiment, when the user requests their credit score, the credit pre-approval tool may determine whether a pre-approval offer will be made by applying a predictive model. If the predictive model determines that a pre-approval offer should be made, the credit pre-approval tool may prepare a pre-approved offer of credit for the user. In an embodiment, the credit pre-approval tool may require the credit pre-approval tool to obtain detailed credit information from data server 120. This information may include the user's credit history or other relevant information, including, for example, payment history on open and closed accounts, revolving balances, delinquent payments, and defaults. Like the credit score and basic credit information, the detailed credit information may be provided by a third party, such as a credit bureau or other reporting agency, which may charge a fee. In an embodiment, the fee to obtain the detailed credit information may be greater than the fee to obtain the credit score and basic credit information.

The credit pre-approval tool may be in communication with the client devices 101-104, via application server 110 and the network connections described above. Once the pre-approval offer is prepared, the credit pre-approval tool may present the pre-approval offer to the user on the display of the user's client device.

The predictive model applied by the credit pre-approval tool may be a predictive modeling framework developed by machine learning. The predictive model may include continuous learning capabilities that allow it to refit with more recent data as it becomes available.

In an embodiment, the predictive model may be a supervised learning model with a specified target and features. The target of the model may be whether the user applied for a credit product when presented with a pre-approval offer. The features of the model may be selected from the data stored in the user information database, and may be a subset of this data taken from the detailed credit information and the application usage data. In addition, the subset of data used may increase, may decrease, or may otherwise be modified over time as the development of the predictive model continues.

The predictive model may be developed by machine learning algorithms. In an embodiment, the machine learning algorithms employed may include gradient boosting machine, logistic regression, neural networks, or a combination thereof, however, it is understood that other machine learning algorithms may be utilized. In an embodiment, the predictive model may be developed using foundational testing data generated by randomly presenting pre-approval offers to a random sample of users of the credit score tool.

Initially, there may not be sufficient foundational testing data available to develop the predictive model. Accordingly, the initial model development may be performed using available incremental credit trade data (i.e., whether the number of credit products (or a specific subset of products such as credit card trades) possessed by the customer increased within a given period). as a proxy target and available data on customer credit management as features. In an embodiment, detailed customer credit management information may be collected on a bimonthly basis, and this data may include the number of open bankcard trades. Through this data, the predictive model may observe whether a user opened new bankcard trades (as long as the user did not close more accounts than were opened) and may develop predictions for when users may open additional credit accounts. By doing so, the predictive model may begin to form its understanding of the conditions under which users may be more likely to apply for a new credit product, such as high utilization on existing credit cards and frequent credit score inquiries in the recent past. The results of this initial modeling may support the initial status of the predictive model, and the model may be continuously improved as newer data becomes available.

Figure 2:
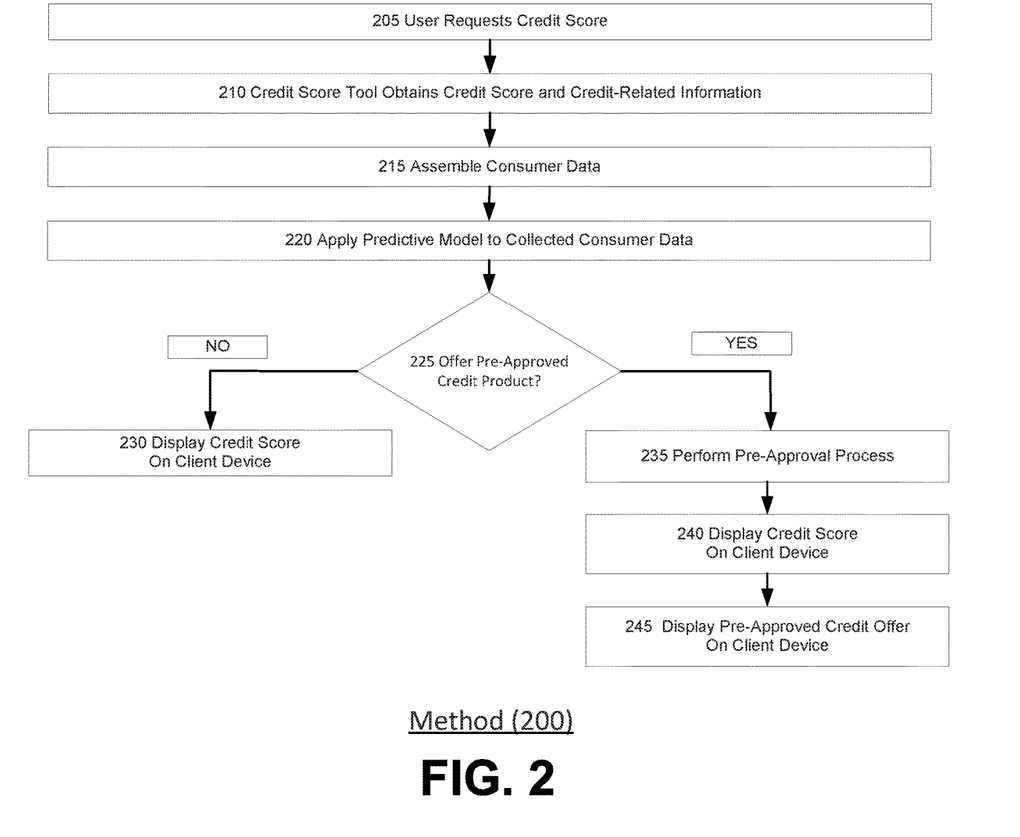
FIG. 2 illustrates a flow chart for the operation of the integrated credit scoring and pre-approval system according to an example embodiment.

FIG. 2 is a flow chart illustrating an example embodiment of the operation of an integrated credit scoring and pre-approval system. In an embodiment, this system may be the integrated credit scoring and pre-approval system 100.

First, in step 205, the user may request a credit score. This request may be placed via a client device, through which the user may access the credit score tool using a software application, a web browser, or another program capable of accessing the credit score tool.

Once the request is placed, the credit score tool may obtain the credit score and basic information associated with the credit score in step 210. In an embodiment, the credit score and basic information associated with it may be provided by one or more credit bureaus or other reporting agencies, and a fee may be required to obtain this information. The credit score tool may coordinate payment of this fee, or may record the charge for later payment. The credit score tool may store this information in the user information database and may prepare to display the credit score (addressed in steps 230 and 240).

Upon receipt of the credit score and basic associated information by the credit score tool, the credit pre-approval tool may assemble the data necessary to determine whether a pre-approved credit offer should be made in step 215. This data may include the user's credit score and basic associated information, along with relevant data from the user information database, such as detailed credit information from past pre-approved credit offers, information from past determinations made by the credit pre-approval tool, and application usage data.

In step 220, the credit pre-approval tool may apply a predictive model to the assembled data. The predictive model may determine whether to offer the user a pre-approved credit product (step 225), and this determination will guide the remainder of the operation of the credit pre-approval tool.

If the predictive model determines that a pre-approved credit product should not be offered to the user, the "NO" option of step 225 may be chosen and the process may advance to step 230 where the credit score tool may display the credit score on the user's client device. If the predictive model determines that a pre-approved credit product should be offered, the "YES" option of step 225 may be chosen and the process may advance to step 235, where the credit pre-approval tool may begin the credit pre-approval process. The credit pre-approval tool may request detailed credit information regarding the user, which may be provided by one or more credit bureaus or other reporting agencies, and a fee may be required to obtain this information. The credit pre-approval tool may coordinate payment of this fee, or may record the charge for later payment. The credit pre-approval tool may store the detailed credit information in the user information database, and the credit pre-approval tool, or another application, may evaluate detailed credit information and any other relevant data to determine the terms of the pre-approved credit product that will be presented to the user. It is understood that the credit pre-approval process may determine that the user is not sufficiently credit-worthy to receive a pre-approved offer of credit, and in this case no offer may be displayed. However, it is further understood that a pre-approved offer of credit may be adapted to users of varying credit worthiness by, for example, presenting an offer for a secured credit product or adjusting the terms of the offered credit product.

Once the pre-approval process is complete, the credit score tool may display the credit score on the user's client device (step 240) and the credit pre-approval tool may display the pre-approved offer of credit on the user's client device (step 245). The user may then view the credit score and the pre-approved offer of credit, and may apply for the pre-approved offer of credit using the credit pre-approval tool.

Figure 3:
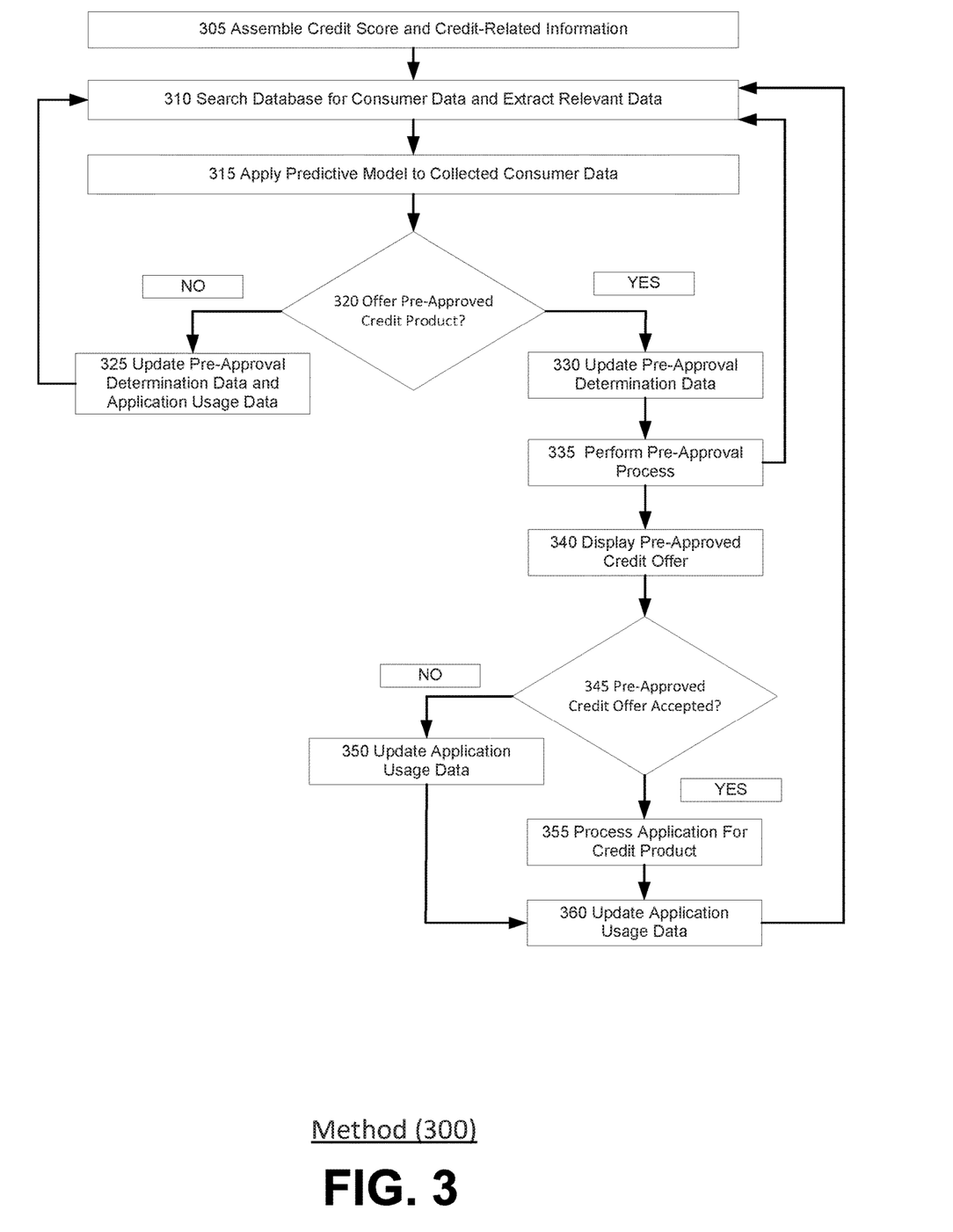
FIG. 3 illustrates a flow chart for the operation of the credit pre-approval tool according to an example embodiment.

FIG. 3 is a flow chart illustrating an example embodiment of the operation of the credit pre-approval tool. The operation illustrated in FIG. 3 may begin upon receipt of the credit score and basic information associated with the credit score and storage of this data in the user information database by the credit score tool.

First, the credit pre-approval tool may assemble the data required by the predictive model. In step 305, the credit pre-approval tool may assemble the credit score and basic associated information obtained by the credit score tool. In step 310, the credit pre-approval tool may search the user information database for additional data relating to the user, including detailed credit information from past pre-approved credit offers, information from past determinations made by the credit pre-approval tool, and application usage data.

Once the required data is assembled, the credit pre-approval tool may apply the predictive model in step 315. If the predictive model determines that a pre-approved credit product should not be offered, the "NO" option of step 320 may be chosen, and the credit pre-approval tool may update the pre-approval determination data for the user that is stored in the user information database to reflect this determination (step 325). In addition, the credit pre-approval tool may update the application usage data for the user stored in the user information database, if any has been collected, in step 325. If the predictive model determines that a pre-approved credit product should be offered, the "YES" option of step 320 may be chosen and the credit pre-approval tool may update the pre-approval determination data for the user that is stored in the user information database to reflect this determination (step 330).

Next, in step 335, the credit pre-approval tool may begin the credit pre-approval process. As described with reference to FIG. 2, the credit pre-approval tool may request detailed credit information regarding the user, which may be provided by one or more credit bureaus or other reporting agencies. A fee may be required to obtain the detailed credit information, and the credit pre-approval tool may coordinate payment of this fee, or may record the charge for later payment. The credit pre-approval tool may store the detailed credit information in the user information database, and the credit pre-approval tool, or another application, may evaluate detailed credit information and any other relevant data to determine the terms of the pre-approved credit product that will be presented to the user. It is understood that the credit pre-approval process may determine that the user is not sufficiently credit-worthy to receive a pre-approved offer of credit, and in this case no offer may be displayed. However, it is further understood that a pre-approved offer of credit may be adapted to users of varying credit worthiness by, for example, presenting an offer for a secured credit product or adjusting the terms of the offered credit product.

In step 340, the credit pre-approval tool may display the pre-approved offer of credit on the user's client device. The user may review the offer and may decide whether to accept the offer and apply for the pre-approved credit product or to decline the offer in step 345.

If the user declines the pre-approved offer of credit, the "NO" option of step 345 may be chosen. The process may then advance to step 350, where the credit pre-approval tool may update the application usage data for the user stored in the user information database.

If the user accepts and applies for the pre-approved offer of credit, the "YES" option of step 345 may be chosen. In step 355, the credit pre-approval tool may process the user's application for the pre-approved offer of credit, which may include receiving additional information and/or authentication from the user. The credit product may be issued upon completion of step 355, or additional steps may need to be taken prior to issuance. Once step 355 is completed, the process advances to step 360, where the credit pre-approval tool may update the application usage data for the user stored in the user information database.

Accordingly, as shown in FIG. 3, the user information database may be updated at several points during the operation of the credit pre-approval tool. By performing these updates, the credit pre-approval tool may provide additional data for the predictive model, which may inform future pre-approval offer determinations and may be used to further develop the predictive model. In an embodiment, the customer information database may be updated with the additional data in real-time, or close to real-time. This may provide for continuous, or near continuous, updating of the customer information database and improvement of the predictive model.

Figure 4A:
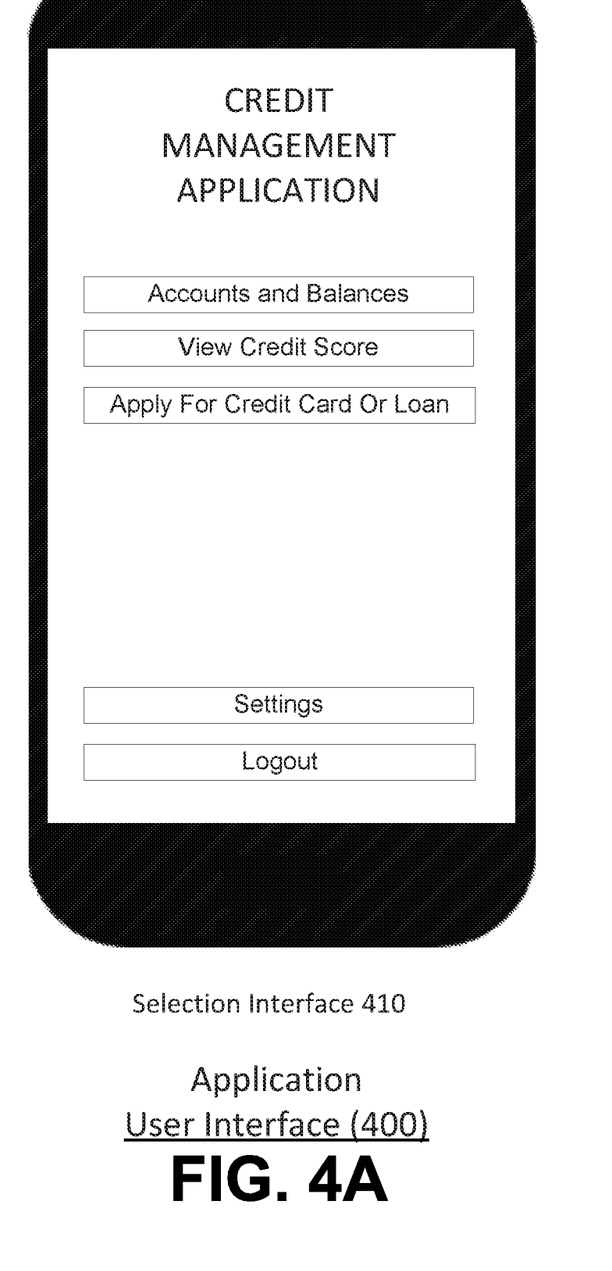
FIGS. 4A-4C illustrate application user interfaces according to example embodiments.
Figure 4B:
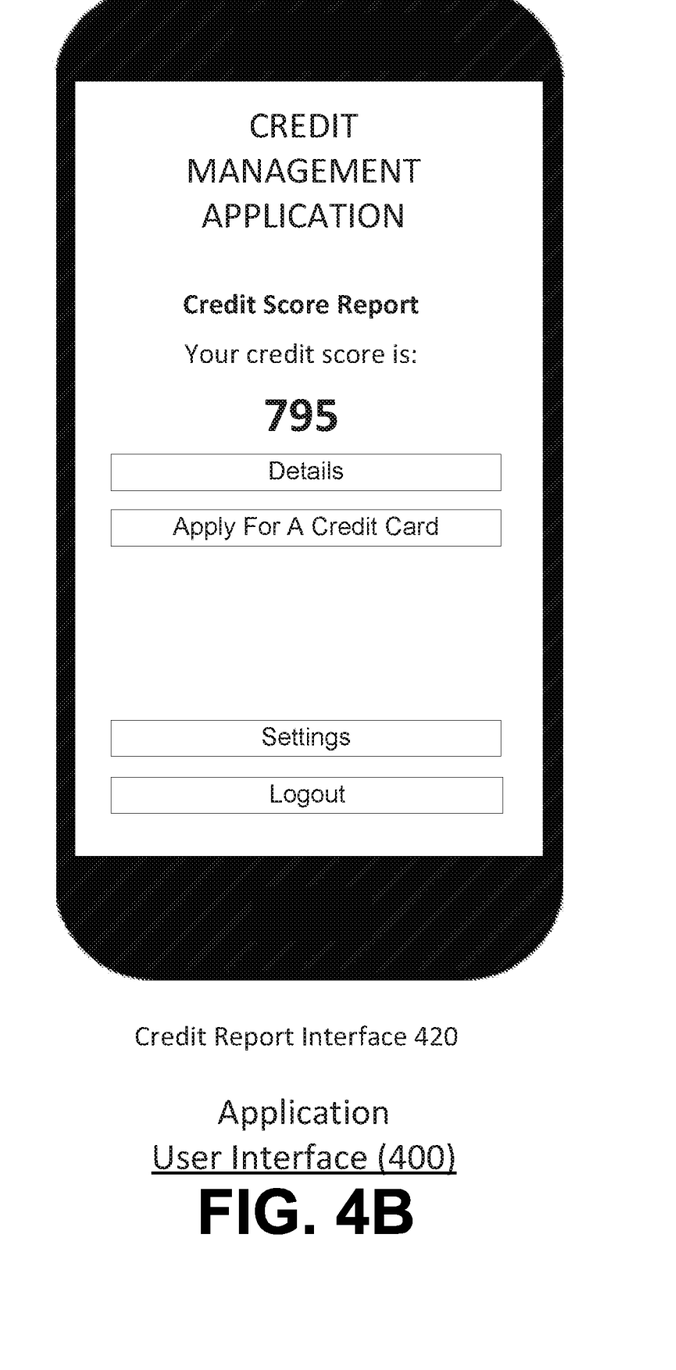
Figure 4C:
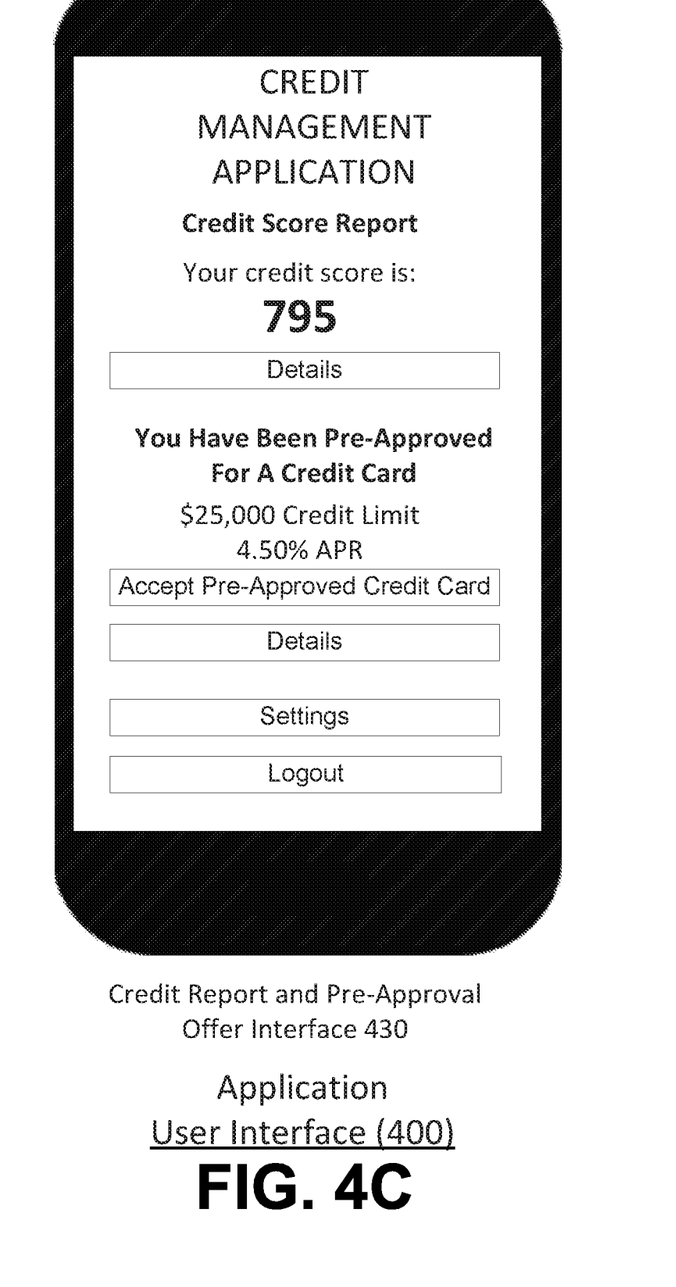

FIGS. 4A-4C illustrate a series of application user interfaces of a user's client device according to example embodiments. The application user interface 400 shown in these figures may be displayed on a smartphone, tablet computer, laptop computer, desktop computer, or any other client device where a credit management application has been installed. In an embodiment, the application user interface 400 may be adapted to a mobile client device, including a smart phone and a tablet computer. In another embodiment, the application user interface 400 may be adapted to a client device with more system resources, including a laptop computer or desktop computer.

As shown in FIG. 4A, the application user interface 400 may present a selection interface 410 on the display of the user's client device. The selection interface 410 may include several options for the user, such as an option to check the user's accounts and balances, an option to view the user's credit score, and an option to apply for a credit card, loan, or other credit product. The selection interface 410 may also present options to check account or applications settings and to log out of the application.

In an embodiment, the user's choice to view their credit score will initiate the credit score tool and the credit pre-approval tool discussed above. This will result in the application user interface 400 displaying the credit report interface 420 (FIG. 4B) if the credit pre-approval tool determines not to present the user with a pre-approved offer of credit or the credit report and pre-approval offer interface 430 (FIG. 4C) if the credit pre-approval tool determines to present the user with a pre-approved offer of credit.

As shown in FIG. 4B, the application user interface 400 may present the credit report interface 420. This interface includes the user's credit score as received by the credit score tool, and may present the user with an option to review further details about the credit score report. If the user elects to view further details, additional information regarding the credit score, such as factors evaluated, how each factor contributed to the score, and other relevant information may be presented. In addition, the user may be presented with an option to apply for a credit card, however, it is understood that this not a pre-approved offer of credit. Rather, this option is for a credit application initiated solely by the user, with no guarantee of approval. If the user elects to apply for a credit card, the credit score tool may record this action and update the user information database with information relating this choice, including the user's credit score and associated information and the user's application usage data.

As shown in FIG. 4C, the application user interface 400 may present the credit report and pre-approval offer interface 430. As with the credit report interface 420, the credit report and pre-approval offer interface 430 includes the user's credit score as received by the credit score tool, and may present the user with an option to review further details about the credit score report. If the user elects to view further details, additional information regarding the credit score may be presented. In addition, based on the determination made by the credit pre-approval tool, a pre-approved offer of credit may be presented to the user. For example, the user may be informed that they have been pre-approved for a credit card, and details regarding the available credit limit and applicable interest rate (shown as an annual percentage rate in FIG. 4C) may be included in the credit report and pre-approval interface 430. In addition, the user may be presented with an option to view the complete details of the pre-approved offer of credit. If the user elects to accept the pre-approved offer of credit, the user may be prompted to provide additional information necessary to issue the credit product. Further, if the user accepts the pre-approved offer of credit, the credit pre-approval tool may record this action and update the user information database with information relating this choice, including the user's application usage data.

Figure 5A:
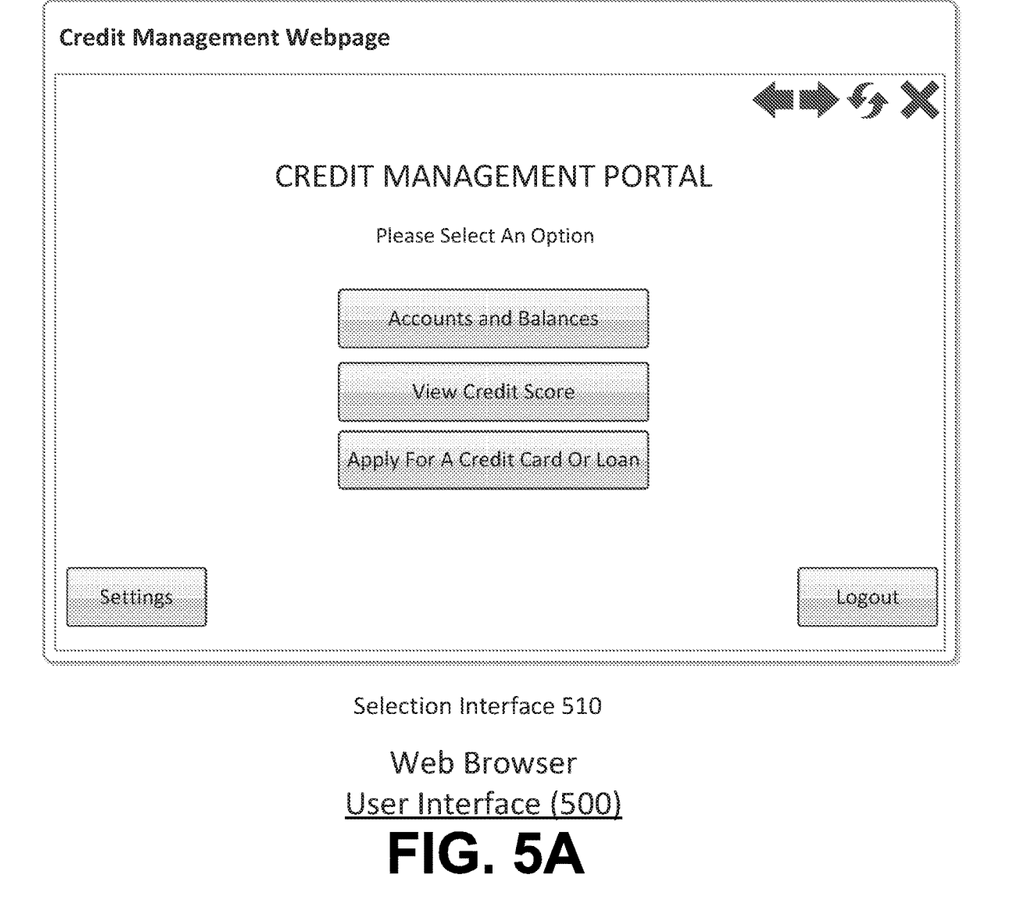
FIGS. 5A-5C illustrate web browser user interfaces according to example embodiments.
Figure 5B:
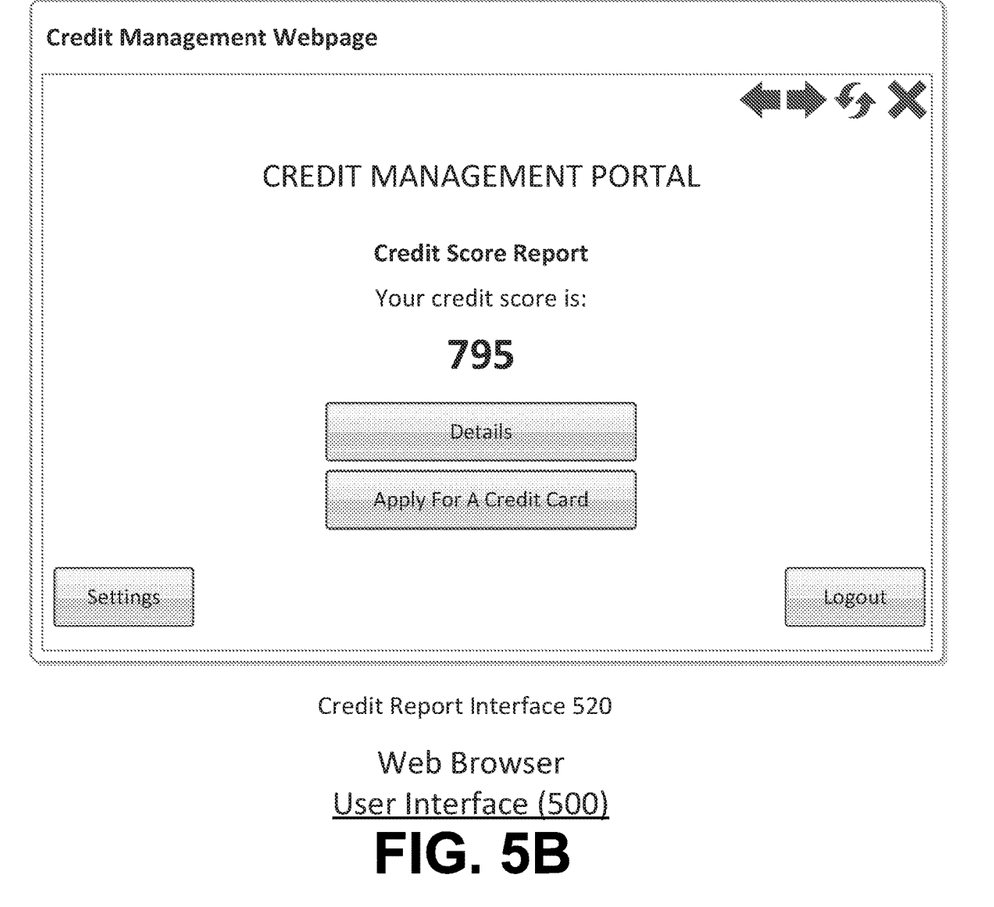
Figure 5C:
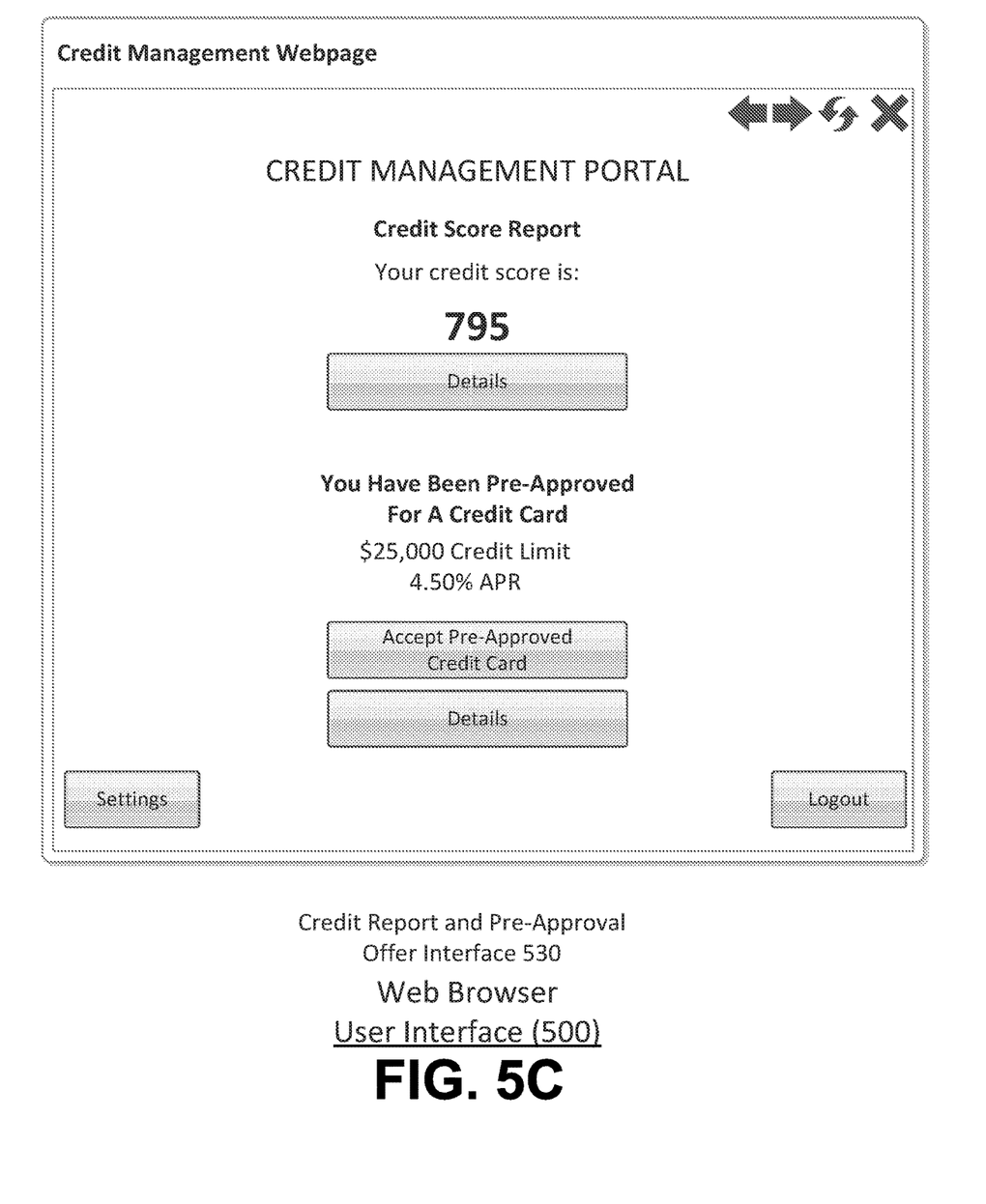

FIGS. 5A-5C illustrate a series of web browser user interfaces according to example embodiments. The web browser user interface 500 shown in these figures may be displayed on a smartphone, tablet computer, laptop computer, desktop computer, or any other client device where a web browser has been installed. In an embodiment, the web browser user interface 500 may be adapted to a mobile client device, including a smart phone and a tablet computer. In another embodiment, the web browser user interface 500 may be adapted to a client device with more system resources, including a laptop computer or desktop computer.

As shown in FIG. 5A, the web browser user interface 500 may present a selection interface 510 on the display of the user's client device. The selection interface 510 may present information and options similar to the selection interface 410 presented by the application interface 400, including options to check accounts and balances, view credit score, and to apply for a credit card or loan, check account or applications settings, to log out and end the web browser session.

As shown in FIG. 5B, the web browser user interface 500 may present a credit report interface 520, which may be displayed when the credit pre-approval tool determines not to present the user with a pre-approved offer of credit. The credit report interface 520 may present information and options similar to the credit report interface 420 presented by the application interface 400, including the user's credit score as received by the credit score tool, and options to review further details about the credit score report and to apply for a credit card. It is understood that the option to apply for a credit card is not a pre-approved offer of credit; instead this option is for a credit application initiated solely by the user, with no guarantee of approval. If the user elects to apply for a credit card through credit report interface 520, the credit score tool may record this action and update the user information database with information relating this choice, including the user's credit score and associated information and the user's application usage data.

As shown in FIG. 5C, the web browser user interface 500 may present a credit report and pre-approval offer interface 530, which may be displayed when the credit pre-approval tool determines to present the user with a pre-approved offer of credit. The credit report and pre-approval offer interface 530 may present information and options similar to the credit report and pre-approval offer interface 430 presented by the application interface 400, including the user's credit score as received by the credit score tool and an option to review further details about the credit score report. In addition, a pre-approved offer of credit may be presented based on the determination made by the credit pre-approval tool, including the available credit limit and applicable interest rate (shown as an annual percentage rate in FIG. 5C) and an option to view the complete details of the pre-approved offer of credit. If the user elects to accept the pre-approved offer of credit, the user may be prompted to provide additional information necessary to issue the credit product. Further, if the user accepts the pre-approved offer of credit, the credit pre-approval tool may record this action and update the user information database with information relating this choice, including the user's application usage data.

In an embodiment, the credit management application user interface 400 and web browser user interface 500 may be accessible only after the user is authenticated (authentication interfaces not shown in FIGS. 4A-4C and FIGS. 5A-5C). Embodiments of the present disclosure provide for various methods of authentication, including passwords, security questions, swipe patterns, image recognition, driver's license scan, multifactor authentication, and biometric authentication (e.g., voice recognition, a fingerprint scan, a retina scan, and a facial scan, if supported by the client device).

Embodiments of the present disclosure are not limited to pre-approval of credit offers for individual persons, and may be applicable to commercial credit lines, syndicated loans, educational loans, collateralized obligations, hybrid financing, and other lines of credit and financial instruments. It is understood that the terms "credit product," "offer of credit," "line of credit" and the like refer to any credit product or credit-related product, such as a new line of credit, an expansion of an existing line of credit, a loan, a mortgage, new terms on existing credit products (e.g., a new interest rate, a new loyalty reward, a new purchase reward), and temporary new terms (e.g., a temporary interest rate applied to new balance transfer, a temporary bonus for certain purchases). It is further understood that the present disclosure is not limited to credit products originated from a single lender, and may be applicable to products originated by a group of lenders. In addition, it is understood that the present disclosure is not limited to the electronic presentation of pre-approved credit offers, and may be applicable to pre-approved offers sent via mail, offered via telephone, or presented by any other method of communication.

As described herein, the fee to obtain the detailed credit information necessary to make a pre-approved offer of credit may be substantially more than the fee to obtain a user's credit score and basic associated information, and the system resources required to generate a pre-approved offer of credit may be substantially more than the resources necessary to present a user's credit score. In addition, users who are likely not interested in additional credit may not be receptive to pre-approval offers, and the presentation of such offers may downgrade the user's experience. Thus, by reducing the number of pre-approval offers presented, and by targeting offers users who are likely to be receptive to such offers, embodiments of the present disclosure may conserve financial and system resources and improve efficiency in making pre-approval offers, while improving user experience.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A credit scoring and pre-approval system comprising:
   a server comprising a processor and a memory, wherein the memory contains a credit score tool and a credit pre-approval tool; and
   a database containing prior pre-approval offer determinations made by the credit pre-approval tool, and application usage data, the application usage data comprising data relating to the user's interaction with the credit score tool, including the device used by the user to access the credit score tool and the time spent by the user interacting with the credit score tool, the database in data communication with the processor,
   wherein, upon receipt of a credit score request from a client device, the processor is configured to:
   execute the credit score tool to obtain a credit score associated with a user and associated credit score information,
   execute the credit pre-approval tool to apply a predictive model to the received credit score, the associated credit score information, prior pre-approval offer determinations, and application usage data to determine whether to transmit a pre-approved offer of credit for display on a user interface of the client device, wherein:
      the predictive model is developed using testing data generated by randomly presenting pre-approval offers to a random sample of users of the credit score tool,
      the predictive model includes a target variable of whether an application was submitted for a pre-approved offer of credit,
      the predictive model includes a set of predictor variables, the set of predictor variables including at least the application usage data, and
      the predictive model is updated upon changes to the database through the use of a gradient boosting algorithm; and
   execute the credit pre-approval tool to transmit a pre-approved offer of credit to the client device;
   wherein, upon transmission of a pre-approved offer of credit for display on the user interface of the client device, the processor is further configured to:
   record whether a user applies for the displayed pre-approved offer of credit,
   record the user's interaction with the user interface,
   update the application usage data stored in the database, and
   apply a gradient boosting algorithm to update the predictive model based on the database.

2. The credit scoring and pre-approval system of claim 1, wherein the set of predictor variables further includes the received credit score, the associated credit score information, and the prior pre-approval offer determinations.

3. The credit scoring and pre-approval system of claim 1, wherein:
   the database further contains user information, and
   the set of predictor variables includes user information from the database.

4. The credit scoring and pre-approval system of claim 1, wherein the pre-approved offer of credit transmitted to the client device is configured for display by a mobile device application.

5. The credit scoring and pre-approval system of claim 1, wherein the pre-approved offer of credit transmitted to the client device is configured for display by a web browser.

6. The credit scoring and pre-approval system of claim 1, wherein the application usage data further includes the number of times the user has requested the credit score, how many times the user has viewed the credit score, and a record of decisions by the user in response to offers of credit.

7. The credit scoring pre-approval system of claim 1, wherein the application usage data is updated in real-time as the user interacts with the credit pre-approval tool.

8. The credit scoring pre-approval system of claim 1, wherein the credit pre-approval tool records whether the user applies for the displayed pre-approved offer of credit and updates the prior pre-approval offer determinations and application usage data.

9. The credit scoring pre-approval system of claim 1, wherein the credit score tool is in data communication with an external data source and receives the credit score and associated credit information from the external data source.

10. The credit scoring and pre-approval system of claim 1, wherein the predictive model is developed using periodically collected credit card trades.

11. The credit scoring and pre-approval system of claim 1, wherein the application usage data is updated in real-time upon recording whether a user applies for the displayed pre-approved offer of credit.

12. A method for credit scoring and pre-approval, comprising:
developing, by a processor, a predictive model using testing data generated by randomly presenting pre-approval offers to a random sample of users of a credit score tool;
establishing, by the processor, data communication with one or more databases containing a credit score, associated credit score information, one or more prior pre-approval determinations, and application usage data comprising data relating to the user's interaction with the credit score tool, including the device used by the user to access the credit score tool and the time spent by the user interacting with the credit score tool;
applying, by the processor, a predictive model to the credit score, the associated credit score information, the prior pre-approval offer determinations, and the application usage data, the predictive model including a target variable and a plurality of predictor variables, wherein the target variable is whether an application was submitted for a pre-approved offer of credit and the plurality of predictor variables includes the credit score, the associated credit score information, the prior pre-approval offer determinations, and the application usage data; and
determining, by the processor and based on the predictive model, whether to transmit a pre-approved offer of credit for display on a user interface of at least one of the first client device or a second client device;
updating, by the processor, the predictive model through the use of a gradient boosting algorithm upon a change to one or more of the credit score, the associated credit score information, the prior pre-approval offer determinations, and the application usage data;
executing the credit pre-approval tool to transmit a pre-approved offer of credit to the client device;
upon transmission of a pre-approved offer of credit for display on the user interface of at least one of the first client device or a second client device:
recording whether a user applies for the displayed pre-approved offer of credit,
recording the user's interaction with the user interface, and
updating the application usage data.

13. The method for credit scoring and pre-approval of claim 12, wherein the application usage data further includes the number of times a user has requested the credit score, how many times the user has viewed the credit score, and a record of decisions by the user in response to offers of credit.

14. The method for credit scoring and pre-approval of claim 13, further comprising:
providing a database of credit-related activity by the user for use in the set of predictor variables to develop the predictive model,
wherein the credit-related activity includes incremental bankcard trade by the user and the number of open bankcard trades made by the user.

15. The method for credit scoring and pre-approval of claim 13, further comprising:
removing at least one of the received credit score, the associated credit score information, prior pre-approval offer determinations, and application usage data from the set of predictor variables.

16. A credit pre-approval device, comprising:
a processor in data communication with a database containing information relating to a user, including a credit score, associated credit score information, prior pre-approval offer determinations made by a credit pre-approval tool, and application usage data, the application usage data comprising data relating to the user's interaction with a credit score tool, including the device used by the user to access the credit score tool and the time spent by the user interacting with the credit score tool,
wherein the processor applies a predictive model to the information contained in the database, the predictive model including whether the user applied for the displayed pre-approved offer of credit as a target variable and a set of predictor variables, the set of predictor variables including at least the application usage data,
wherein the predictive model is developed using testing data generated by randomly presenting pre-approval offers to a random sample of users of the credit score tool,
wherein the processor updates the predictive model upon changes to the database through the use of a gradient boosting algorithm,
wherein the processor executes the credit pre-approval tool to transmit a pre-approved offer of credit to the client device, and
wherein, upon transmission of a pre-approved offer of credit for display on a user interface, the processor:
records the user's interaction with the user interface,
updates the application usage data stored in the database, and
applies the gradient boosting algorithm to update the predictive model based on the database.

17. The credit pre-approval device of claim 16, wherein the application usage data is updated in real-time upon recording whether the user applies for the displayed pre-approved offer of credit.

18. The credit pre-approval device of claim 16, wherein the application usage data further includes the number of times the user has requested the credit score, how many times the user has viewed the credit score, and a record of decisions by the user in response to offers of credit.

19. The credit scoring and pre-approval system of claim 16, wherein the predictive model is initially developed using incremental credit trade data.

20. The credit scoring and pre-approval system of claim 19, wherein the predictive model is continuously updated as new incremental credit trade data becomes available.

* * * * *